April 13, 1926.
H. P. SPARKES
1,580,450
ELECTRICAL MEASURING INSTRUMENT
Filed Nov. 29, 1921
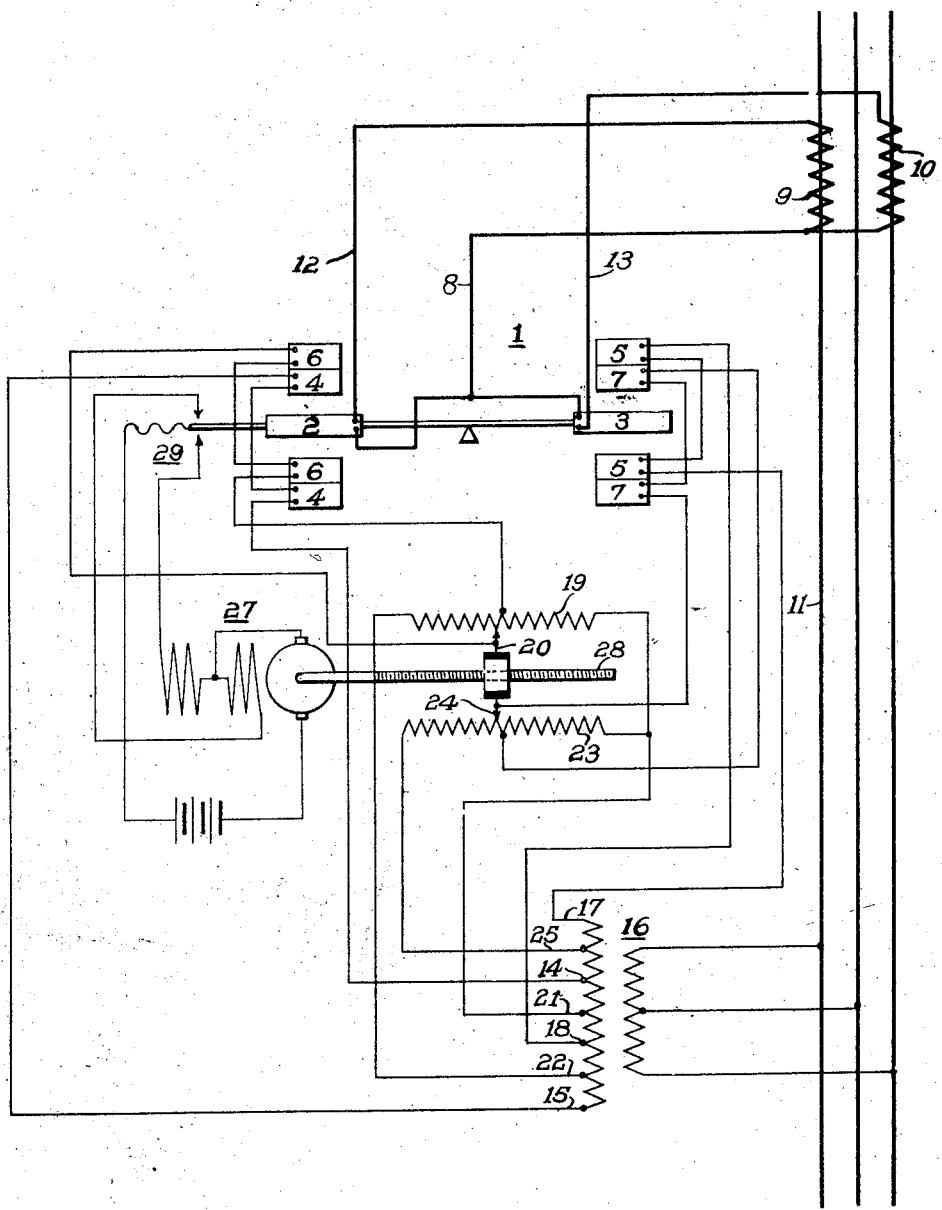
WITNESSES:
INVENTOR
Harry P. Sparkes.
BY
ATTORNEY Patented Apr. 13, 1926.

1,580,450

UNITED STATES PATENT OFFICE.

HARRY P. SPARKES, OF WILKINSBURG, PENNSYLVANIA, ASSIGNOR TO WESTINGHOUSE ELECTRIC & MANUFACTURING COMPANY, A CORPORATION OF PENNSYLVANIA.

ELECTRICAL MEASURING INSTRUMENT.

Application filed November 29, 1921. Serial No. 518,739.

*To all whom it may concern:*

Be it known that I, HARRY P. SPARKES, a citizen of the United States, and a resident of Wilkinsburg, in the county of Allegheny and State of Pennsylvania, have invented a new and useful Improvement in Electrical Measuring Instruments, of which the following is a specification.

My invention relates to electrical measuring instruments and particularly to power-factor meters.

One object of my invention is to provide a polyphase power-factor meter that shall operate correctly on a circuit having unbalanced phases.

Another object of my invention is to provide a polyphase power-factor meter that shall embody only one movable element and that shall have stationary elements, for actuating the same, so arranged as to effect interacting fluxes free of physical errors.

Heretofore, certain power-factor meters have been provided for polyphase circuits but, by reason of the inability thereof to indicate correctly under unbalanced phase conditions, they have been of very limited service.

In practicing my invention, I provide a single meter comprising an element responsive to the power component of a circuit and a second element responsive to the reactive component of the circuit. These elements are arranged to oppose each other and to so control an electro-responsive device, in circuit with one of the same, as to give a correct indication of the power factor of the circuit being measured, irrespective of unbalanced conditions in the latter.

The single figure of the accompanying drawing is a diagrammatic view of a power-factor meter embodying my invention and the circuit thereof.

A meter 1, of the Kelvin-balance type, comprises movable current coils 2 and 3, two sets of stationary reactive-component voltage coils 4 and 5 and two sets of stationary power-component voltage coils 6 and 7.

The current coils 2 and 3 have a common lead 8 connecting the same to one terminal of each of the current transformers 9 and 10 that are associated, respectively, with two phases of a three-phase circuit 11, and leads 12 and 13 that are connected to the other terminals of the transformers 9 and 10.

The stationary reactive-component voltage coils 4 are connected in series relation to each other across taps 14 and 15 of a transformer 16, and the stationary reactive-component voltage coils 5 are similarly connected across taps 17 and 18 of the transformer 16. The stationary power-component voltage coils 6 are connected, through a slide resistor 19 and a sliding contact member 20, between taps 21 and 22 of the transformer 16, and the stationary power-component voltage coils 7 are similarily connected through a slide resistor 23 and a sliding contact member 24, between the tap 21 and a tap 25 of the transformer 16.

It has been found that a transformer or reactor having taps brought out at 57.7% 100% and 115.4% of the normal voltage will give the desired connections to provide voltages substantially 90° out of phase with each other. That is, the voltage from the 115.4% point or tap 15 of the transformer 16 to the 57.7% point tap 18 thereof is equal to $$\sqrt{(115.4)^2 - (57.7)^2}$$

or 100 volts and is at right angles to the normal potential between the taps 21 and 22. Similarly, the voltage from the tap 17 to the tap 14 is equal to 100 volts at right angles to the normal potential between the taps 21 and 25. Thus, the coils 4 and 5 are supplied with currents proportional to the reactive-component voltages of two of the phases of the circuit 11, and the coils 6 and 7 are supplied with currents proportional to the power-component voltages of two of the phases of the circuit 11.

To avoid physical errors caused by air-gap resistance and unbalanced fluxes, the coils 4 and 6 are arranged so that one of the coils 4 is placed next adjacent to the movable coil 2 at one side of the latter, with one of the coils 6 disposed beyond the coil 4, and one of the coils 6 is placed next adjacent to the coil 2 at the other side of the latter, with the other coil 4 disposed beyond the latter coil 6. Similarly, the coils 5 and 7 are alternately disposed on each side of the movable current coil 3.

The sliding contact members 20 and 24 are actuated in a usual and well known manner, as by a separately-energized motor 27 which operates a worm screw 28 and is controlled by contact members 29 of the Kelvin balance 1.

In operation, the coils 2 and 3 are affected in accordance with the differential effect between the fluxes of the power and reactive component coils, and this effect may be made equal at any desired power factor. In case the power factor changes from the predetermined value, the sliding contact members 20 and 24 will be moved along the resistors 19 and 23 a distance proportional to the change in power factor. This movement so changes the current in the power-component voltage coils 6 and 7 as to again balance the interacting fluxes of the coils 2, 3, 4, 5, 6 and 7 and the sliding contact member will come to rest.

Since it requires a predetermined amount of resistance to counteract the change in flux caused by the change in power factor, the value of the resistance, and, consequently, the degree of movement of the sliding contact members may be taken as a measure of the power factor of the circuit 1. The sliding contact members may be provided with a pointer or a stylus (not shown) to indicate or record the changes in power factor.

While I have shown and described a particular form of my invention, changes may be effected therein without departing from the spirit and scope thereof, as set forth in the appended claims.

What I claim as my invention is:

1. The combination with a flux-responsive element, of means for affecting the same in accordance with the resultant of a plurality of fluxes comprising groups of flux-supplying elements adjacent to opposite sides of the flux-responsive element, each element of each group being energized similarly to an element of the other and the elements of each group being arranged in predetermined order relative to the corresponding elements of the other group to provide an accurately balanced actuating flux for said responsive element.

2. In a power-factor meter, the combination with a movable current coil, of a pair of power-component coils and a pair of reactive component coils arranged with one coil of each pair on each side of said current coil, a power-component coil being next to the current coil at one side and a reactive, component coil being next to the current coil at the other side.

3. In a power-factor meter, the combination with a movable current coil, of a pair of power-component coils and a pair of reactive component coils arranged with one coil of each pair on each side of said current coil, a power-component coil being next to the current coil at one side and a reactive-component coil being next to the current coil at the other side, and means controlled by movement of the current coil for varying the current in the power-component coils.

4. The combination with an element for energization in accordance with one quantity of a circuit, of a structure comprising two pairs of co-operating elements disposed one pair on each side of said first element with one element of each pair adjacent to said first element between the latter and the other element of the pair, the adjacent elements of said structure on opposite sides of said first element being for energization in accordance with quantities of the circuit different from each other and from the first quantity and each outer element of said structure being for energization by one of said second quantities different from the quantity of its corresponding adjacent element.

5. An electrical measuring instrument comprising a movable coil for energization in accordance with one quantity of a circuit and two pairs of stationary coils disposed one pair on each side of said movable coil with one coil of each pair adjacent to the movable coil between the latter and the other stationary coil of the pair, the adjacent coils on opposite sides of the movable coil being for energization in accordance with quantities of the circuit different from each other and from the first said quantity and each outer coil being for energization by one of said second quantities different from the quantity of its corresponding adjacent coil.

6. An electrical measuring instrument comprising a Kelvin balance embodying two movable coils for energization in accordance with the current of a circuit and four pairs of stationary coils disposed one pair on each side of each movable coil with one coil of each pair adjacent to its corresponding movable coil between the latter and the other stationary coil of the pair, the adjacent coils on opposite sides of one movable coil being for energization in accordance with the power and reactive-component voltages, respectively, of the circuit and the outer coils thereof being for energization in accordance with the reactive and power-component voltages, respectively, in the order named, and the stationary coils for co-operation with the other movable coil being for similar energization and arrangement inversely to said order.

In testimony whereof, I have hereunto subscribed my name this 16th day of November 1921.

HARRY P. SPARKES.